Figure 1:
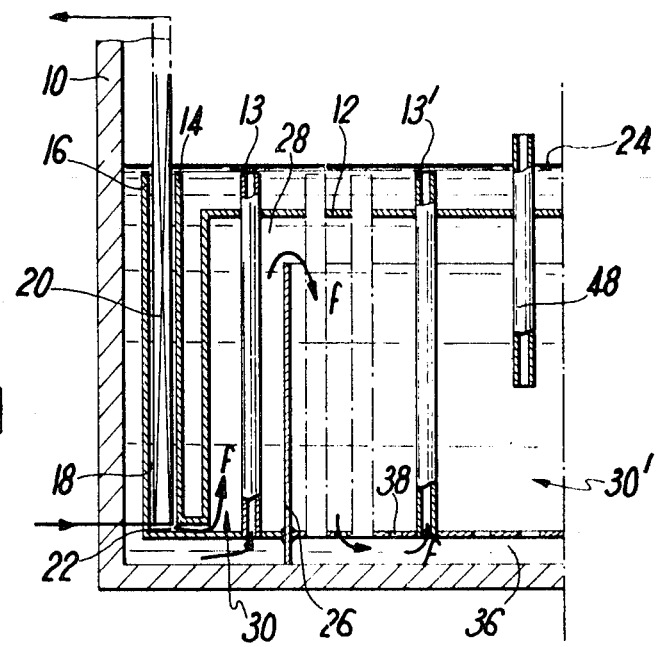

United States Patent

[11] 3,607,633

| [72] | Inventor | Maurice Fajeau |
| | | Verrieres Le Buisson, France |
| [21] | Appl. No. | 714,866 |
| [22] | Filed | Mar. 21, 1968 |
| [45] | Patented | Sept. 21, 1971 |
| [73] | Assignee | Commissariat a L'Energie Atomique |
| | | Paris, France |
| [32] | Priority | Apr. 5, 1967 |
| [33] | | France |
| [31] | | 104138 |

[54] BOILING HEAVY WATER INDIRECT-CYCLE REACTOR
5 Claims, 2 Drawing Figs.

| [52] | U.S. Cl. | 176/54, 176/55 |
| [51] | Int. Cl. | G21c 15/00 |
| [50] | Field of Search | 176/54, 55 |

[56] References Cited
UNITED STATES PATENTS

| 3,180,802 | 4/1965 | West et al. | 176/54 |
| 3,322,641 | 5/1967 | Williamson et al. | 176/54 |
| 3,325,374 | 6/1967 | Margen | 176/54 X |
| 3,275,524 | 9/1966 | Williams | 176/54 X |
| 3,331,747 | 7/1967 | Williamson | 176/54 |

FOREIGN PATENTS

| 797,485 | 11/1956 | England | 176/61 |
| 1,368,086 | 9/1963 | France | 176/54 |

Primary Examiner—Leland A. Sebastian
Assistant Examiner—S. R. Hellman
Attorney—Cameron, Kerkam and Sutton

ABSTRACT: The boiling heavy water reactor has heat exchangers located in the pressure vessel around a tank containing part of the heavy water inventory which constitutes the moderator. The flow of heavy water used as coolant circulates along two different paths. The first path comprises the heat exchangers, the interior of the tank and certain of the guide tubes locating the fuel elements. The second path comprises the other guide tubes. Both paths open into a collector space above the tank.

BOILING HEAVY WATER INDIRECT-CYCLE REACTOR

The present invention relates to a boiling heavy water reactor having an indirect cycle, namely a reactor which comprises a heat exchanger between the primary coolant consisting of heavy water and a secondary fluid which is intended, for example, to be delivered to turbines.

The majority of boiling heavy water reactors differ from boiling light water reactors in two essential respects. In the first place, in order to overcome the problems arising from the fact that no leakage of tritiated steam can be permitted, such reactors are preferably of the indirect cycle type. Secondly, different fractions of the heavy water volume which is present within the pressure vessel constitute both moderator and coolant, although this latter naturally has a moderating function which is by no means negligible. Especially for neutronic reasons (achievement of optimum moderation for minimum heavy water investment), it is sought to maintain the moderator heavy water at relatively low temperature whilst considerations of thermodynamic efficiency make it necessary to provide the heavy water emulsion (mixture of liquid and vapor phases) which is discharged from the pressure tubes with an enthalpy and therefore a quality which is as high as possible.

Up to the present time, in order to circulate heavy water within indirect-cycle reactors, the relatively cold heavy water taken from the heat exchanger has been reinjected into the moderator by means of feed pumps. Thus, the heavy water which passes out of the moderator mixes with the water at saturation temperature which comes from the pressure tubes and this mixture flows down around the moderator receiving tank, then flows up in natural or forced circulation into the pressure tubes whilst the steam is passed to the heat exchanger. This solution is subject to a number of disadvantages. Thermodynamic efficiency is reduced as a result of mixing of the cold heavy water derived from the moderator with saturated heavy water. In the case of a reactor of the integrated heat exchanger type, the presence of pumps which are inaccessible since they are placed inside the pressure vessel represents a serious risk of breakdown.

The invention is concerned with the design concept of a boiling heavy water indirect-cycle reactor, especially of the integrated heat exchanger type, which meets practical requirements more effectively than comparable nuclear reactors which have been proposed in the prior art. To this end, the invention proposes a reactor comprising, within a pressure vessel, a heavy water moderator tank traversed by vertical pressure tubes which contain fuel elements and open at the top ends thereof into a collector space located above said tank, and deflector screens which serve to delimit, starting from said collector space, a first heavy water circuit comprising successively the heat exchangers, the interior of the tank and a first section of the pressure tubes and a second heavy water circuit constituted by a duct which bypasses the heat exchangers and by the other section of the pressure tubes.

The assembly of pressure tubes in series with the moderator makes it possible to put this latter in natural circulation while maintaining it in the cold state. This arrangement provides an appreciable advantage if the series assembly referred to is carried out with the pressure tubes of the central zone of the reactor core, in which the neutron flux intensity is of maximum value. In fact, it is not possible to exceed a given steam quality at the pressure tube outlets on account of the potential hazards of burnout and instability and it is preferable to ensure that the heavy water has an enthalpy of the same order and close to the limit at the outlets of all the pressure tubes. Thus, by supplying the pressure tubes of the peripheral zone with water at saturation temperature which has bypassed the heat exchangers and by supplying the pressure tubes of the central zone with water which has passed through the heat exchangers and the moderator (therefore at a pressure tube inlet temperature which is lower than the saturation temperature), the above-mentioned arrangement makes it possible to equalize the enthalpies at the outlets of all the pressure tubes.

This solution is to be preferred to that which would consist in adapting the inlet flow into the channels at the same inlet temperature since, in respect of a given total cross section for flow (which should be as small as possible in order to reduce the moderator heavy water investment), such a solution corresponds to a maximum total steam flow at the pressure-tube outlets.

Figure 2:
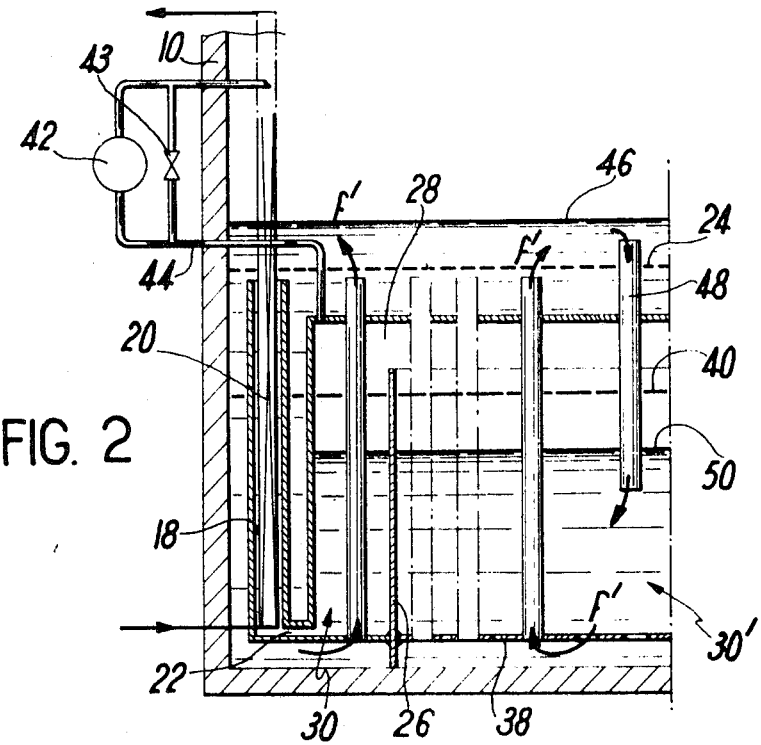

The invention also consists in other arrangements which are preferably employed in conjunction with the preceding but which can be employed separately. A better understanding of the invention will be gained from the following description of one form of construction which is given by way of nonlimitative example. Reference is made to the accompanying drawings, in which:

FIG. 1 is a highly diagrammatic view in half-section along a vertical plane of the reactor core, and in which the levels of heavy water shown correspond to normal operation;

FIG. 2, which is similar to FIG. 1, shows the levels when the reactor is restarted from the cold state.

FIG. 1 shows a portion of the vessel 10 which affords resistance to the pressure of the boiling heavy water, such a vessel being usually constituted by a shell of substantial thickness which may be formed either of steel or of lined prestressed concrete. The lower portion of the vessel contains heavy water in liquid phase. There is disposed within said lower portion a cylindrical tank 12 for receiving the moderator heavy water, said tank being traversed by vertical pressure tubes 13 and 13' disposed on a lattice which may be square, for example, and of uniform pitch. Around the tank 12, partitions 14 and 16 define a duct 18 in which is located the lower portion of the heat exchanger 20, the upper portion of which is immersed in the vapor phase. The duct 18 which is defined by the partitions 14 and 16 is open at the top and communicates at the lower end via a passageway 22 with the peripheral zone of the tank 12. When the level 24 of heavy water corresponds to the normal operation of the reactor, the upper ends of the pressure tubes and the upper end of the duct 18 which are all placed at the same level open into the heavy water.

An annular screen 26 which is joined to the bottom wall of the tank 12 but which leaves a passageway 28 beneath the top wall of the tank forms a separation within this latter between a peripheral zone 30 and a central zone 30'. The screen 26 extends beneath the tank down to the vessel 10 and prevents any direct flow of heavy water from the periphery of the tank 12 towards the distributor space 36 which provides admission to the pressure tubes 13' of the central zone 30'. The bottom wall of the central zone 30' of the tank is pierced by a series of holes 38 disposed on a lattice which is interposed within the lattice of the pressure tubes 13' and permits the heavy water which is present in the central zone to flow into the distributor space 36 and thence to pass into the pressure tubes 13'.

The circulation of heavy water within the reactor can readily be visualized from FIG. 1, in which it is indicated by arrows $f$. Thus, starting from the collector space above the tank, two flow paths are established:

1. A part of the flow of heavy water passes into the duct 18 between the partitions 14 and 16 and is subjected therein to a temperature drop such that the saturation temperature thereof falls to a temperature corresponding to subcooling; this flow of heavy water then enters the peripheral zone 30 of the tank via the passageways 22, flows up within said zone, then down within the central zone 30', passes out of the tank through the holes 38 and penetrates, still in the subcooled state, into the pressure tubes 13' of the central zone 30'. Within these pressure tubes, the heavy water is heated and charged with steam. At the outlets of the pressure tubes, there takes place a separation of phases: the heavy water in liquid phase returns to the top collector space whilst the steam collects at the top of the tank and condenses on the top portion of the heat exchanger 20 which constitutes a light water vaporizer.

2. Another fraction of the heavy water flow passes down around the tank 12 and is admitted directly into the pressure tubes 13 of the peripheral zone at a temperature which is close to saturation. Thus, the heavy water which flows through these tubes 13 is charged with steam and delivered into the collector space with a quality of the same order as that of the heavy water which is delivered from the pressure tubes 13'.

In order to permit reactor startup when the heavy water as a whole is cold, it is usually necessary to ensure that the level of this latter is higher than the top edge of the screen 26. Were this precaution not observed, the communication between the two zones 30 and 30' is no longer established and the pressure tubes 13' are no longer supplied. It is obviously possible to provide a sufficient volume of heavy water within the pressure vessel or to add temporarily an additional mass of heavy water. Either of these solutions lead to additional investments. It is preferable to feed a gas under pressure into the lower portion of the tank 12 in order to force the free level downwards within said tank while causing the free level within the pressure vessel to rise up to the inlet of a pipe which provides a return to the moderator. This procedure can be carried into effect by means of the system which is illustrated in FIG. 2, in which the horizontal broken line 40 indicates the free level of heavy water when the reactor is cold.

The system which is illustrated in FIG. 2 comprises a pump 42 fitted with a bypass valve 43 which draws neutral gas from the upper portion of the pressure vessel and injects it through a pipe 44 at the top portion of the tank 12 and one or a number of tubes 48 which traverse the top wall of the tank and open on the one hand into the interior of this latter and, on the other hand, at a higher level than the normal level 24.

The process of approach to full pressure and power of the initially cold reactor (general level of heavy water at 40) is accordingly as follows: the reactor being maintained in the subcritical state, the pump 42 is started up so as to bring the level of heavy water outside the tank up to 46, namely above the outlet of the tube 48, whereupon the level of the moderator heavy water drops within the tank to 50 (as shown in FIG. 2). The control rods are actuated so as to bring the reactor to a critical condition: the heat generated in the pressure tubes causes the heavy water contained therein to heat progressively and a natural circulation is accordingly established along the path indicated by the arrows $f'$ in FIG. 2. During this heating process, the pump 42 is maintained in service and the bypass valve 43 is operated so as to maintain the external level 46 of heavy water at the same height, thereby producing a progressive rise of the moderator heavy water level within the tank. When the level within the tank reaches the top edge of the screen 26, the free surface of the heavy water outside the tank is permitted to return from level 46 to the normal operation level 24 shown in dashed lines in FIG. 2. From this moment, the normal natural circulation is established although the upper portion of the tank 12 is still filled with gas. The runup to full reactor power is continued until normal operating temperature and pressure are attained and the moderator heavy water completely fills the tank 12.

It is apparent that the invention makes it possible to design a boiling heavy water indirect-cycle reactor in which pumps are wholly dispensed with in the primary circuit through which the heavy water is circulated, and in which the moderator remains at a relatively low temperature although the cross section for flow of the heavy water within the pressure tubes remains at a minimum value and therefore corresponds to a minimum investment.

As will be readily understood, the invention is not limited to the form of construction which has been illustrated and described by way of example and accordingly extends to a number of different alternative forms of all or part of the arrangements herein described which remain within the definition of equivalent means as well as to the methods of startup and operation of the reactor.

What I claim is:

1. A boiling heavy water indirect cycle natural circulation reactor comprising in a pressure vessel whose lower portion contains heavy water and whose upper portion defines a heavy water steam collection space; a heavy water moderator tank distinct from the pressure vessel traversed by vertical pressure tubes for fuel elements and open at the top ends thereof above said tank: and deflector means which form two heavy water loops each including said collector space, the first of which comprises heat exchangers, the interior of the tank and some of the pressure tubes and the second of which comprises passage means bypassing the heat exchangers and including the remainder of the pressure tubes.

2. A reactor in accordance with claim 1, wherein the first part of the pressure tubes of the first loop comprise the pressure tubes which pass through a central zone of the tank and the pressure tubes of the second loop comprise the pressure tubes which pass through a peripheral zone of the tank.

3. A reactor in accordance with claim 1 wherein the heat exchanger is disposed around said tank and includes a portion which is immersed in heavy water in liquid phase and a portion which is immersed in heavy water steam which fills the top portion of the pressure vessel.

4. A reactor in accordance with claim 1, having an annular vertical partition within the tank defining a passageway between the upper end thereof and the tank, said partition providing a separation within the tank between the peripheral zone in which the moderator heavy water is circulated upwardly and the central zone in which the heavy water is circulated downwardly towards openings in the bottom of the central zone of the tank and which open into a distributor for feeding the pressure tubes of the first loop.

5. A reactor in accordance with claim 1, having a startup fluid circuit comprising means for injecting gas under pressure into the top portion of the tank and a tube which opens at one end into the bottom portion of the tank and at the other end outside said tank at a level which is higher than the level of heavy water within the pressure vessel during normal operation of the reactor.